Figure 1:
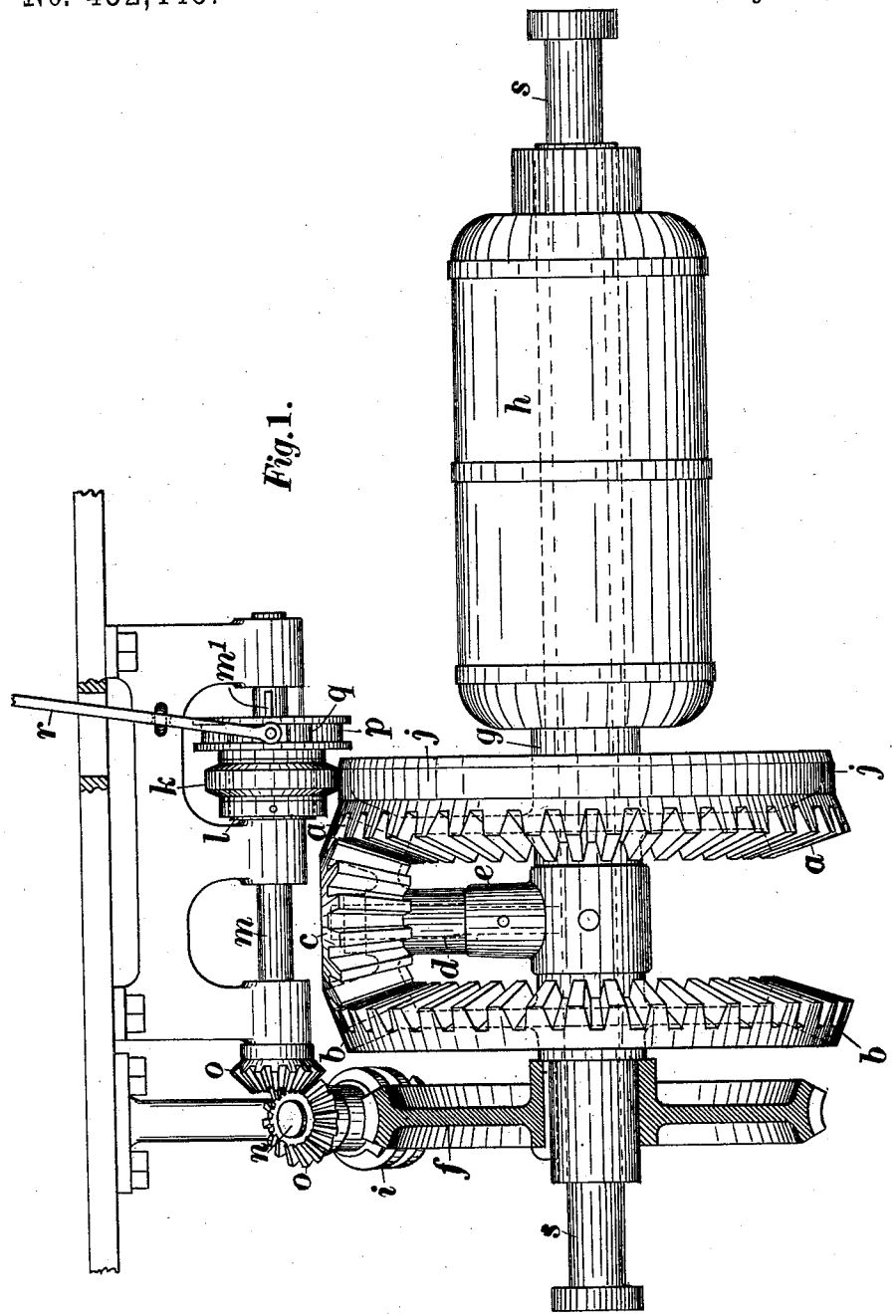

(No Model.) 4 Sheets—Sheet 2.

C. B. WATTLES.
POWER TRANSMITTING DEVICE.

No. 452,445. Patented May 19, 1891.

Attest.
L. Lee.
F. C. Fischer.

Inventor.
Cyra B. Wattles,
per Crane & Miller, attys.

(No Model.) 4 Sheets—Sheet 4.
C. B. WATTLES.
POWER TRANSMITTING DEVICE.

No. 452,445. Patented May 19, 1891.

Attest.
L. Lee
F. C. Fischer

Inventor.
Cyra B. Wattles,
per Crane & Miller, Attys.

UNITED STATES PATENT OFFICE.

CYRA B. WATTLES, OF ELIZABETH, NEW JERSEY.

POWER-TRANSMITTING DEVICE.

SPECIFICATION forming part of Letters Patent No. 452,445, dated May 19, 1891.

Application filed October 28, 1890. Serial No. 369,576. (No model.)

*To all whom it may concern:*

Be it known that I, CYRA B. WATTLES, a citizen of the United States, residing at Elizabeth, Union county, New Jersey, have invented certain new and useful Improvements in Power-Transmitting Devices, fully described and represented in the following specification and the accompanying drawings, forming a part of the same.

The object of this invention is to furnish a simple and effective means of regulating the speed transmitted by differential gearing. In such construction an intermediate gear is usually employed to connect two other cog-wheels, and one of the series is employed as a primary wheel or driver. If the speed of any of these wheels, except the driving-wheel, be varied, the speed of the other wheel will be correspondingly affected, and such differential gearing has for this reason been used as a means for transmitting power with a variable speed, and is especially adapted for transmitting the power of an electric motor to the wheels of a traction-car. To vary the speed of the controlling-wheel, its rotation has sometimes been regulated by means of a friction-brake, and sometimes, where the primary wheel was actuated by an electric motor, the speed of the controlling-wheel has been regulated by an electro-dynamic machine. The variation of speed which may be effected by a brake is not positive, and the regulation effected by electric agency involves the wasteful expenditure of energy, and I have therefore devised the present construction, in which a worm-wheel is used to regulate the rotation of the controlling-wheel. With this construction the controlling-wheel is held stationary by the worm when required, which is the normal operative condition of the controlling-wheel upon a motor-car when moving at its highest speed. To reduce the speed of the driven wheel, the worm is rotated by a connection with the primary or driving wheel, such connection being constructed to vary the speed of the worm, as may be desired.

In the annexed drawings the device is shown actuated by an electric armature, which could be run at a uniform speed, while the speed transmitted to the driven wheel could be varied, when required, as would be necessary in propelling a motor-car upon various grades.

The invention is shown applied to a train of bevel-gears, one of which is an intermediate between two lateral gears, and the worm-regulator may be applied to the intermediate gear or to one of the lateral gears, both of which constructions are illustrated herein.

Figure 2:
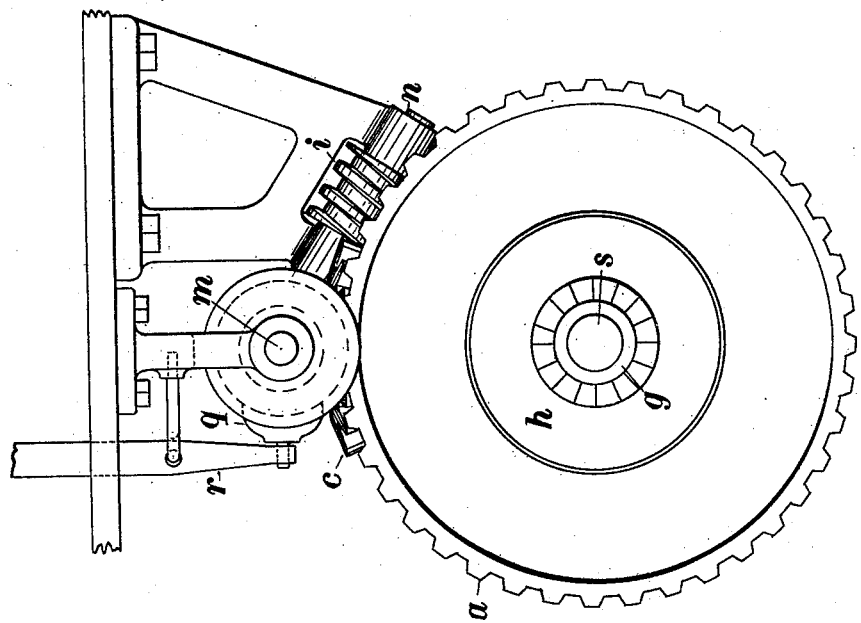
Figure 3:
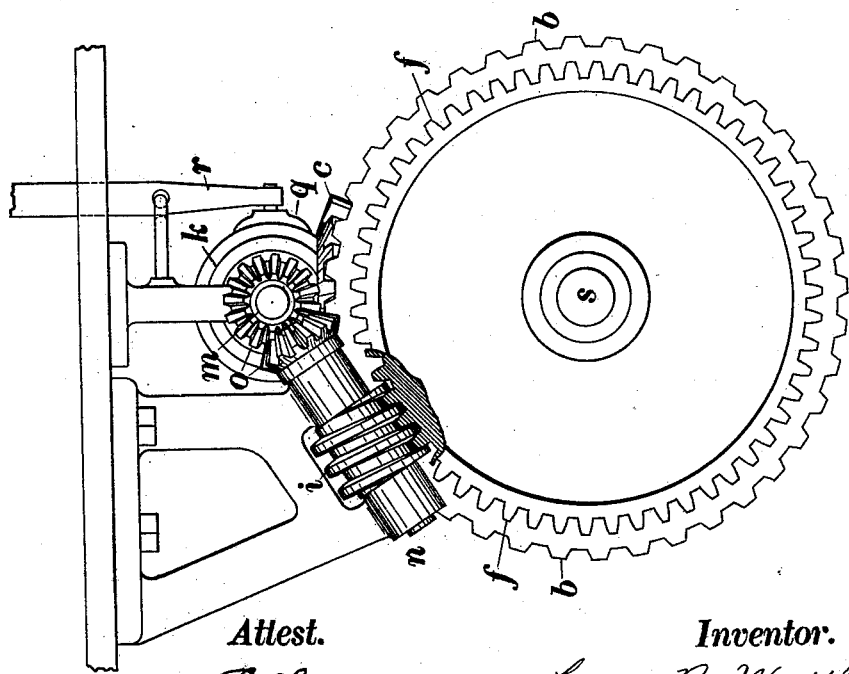
Figure 4:
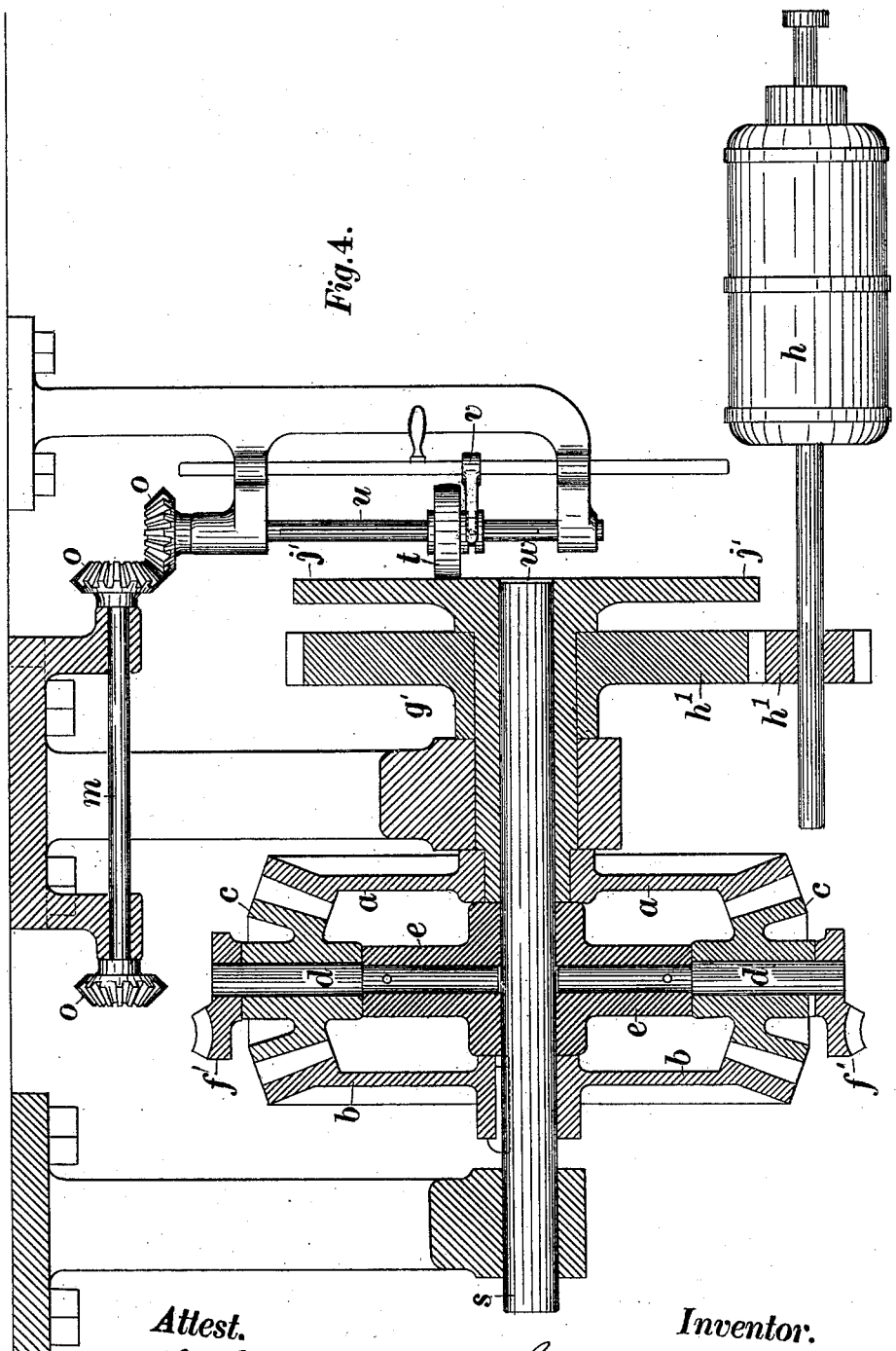
Figure 5:
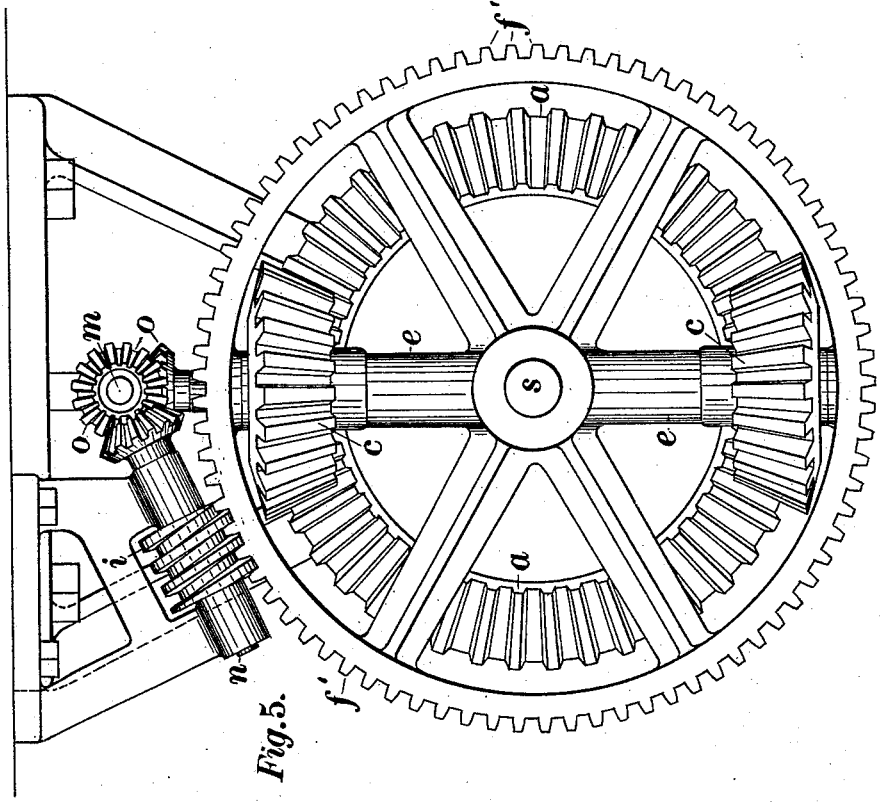

Figure 1 is a longitudinal section upon the center line (where hatched) through the gears shown in Figs. 2 and 3. Fig. 2 is an elevation of the lateral driving-gear with a friction-driver for varying the speed of the worm. Fig. 3 is an end view of the worm-regulator applied to the lateral controlling-gear. Figs. 4 and 5 show the worm-regulator applied to the intermediate gear, with a different form of the friction device for rotating the worm, Fig. 4 being a transverse section, where hatched, through the center of all the gears, and Fig. 5 an end view of the worm-wheel and the connections to the worm, with the intermediate wheels mounted upon radial studs.

In Figs. 1, 2, and 3 the primary or driving gear $a$ is mounted movably upon a shaft $s$ and provided with a sleeve $g$, to which is secured an electric armature $h$. Upon the same shaft is movably fitted a similar gear $b$, and an intermediate gear $c$ is fitted between the two gears upon a stud $d$, projected radially from a hub $e$, which is secured to the shaft $s$.

The worm-regulator is shown applied to the lateral gear $b$, the worm-wheel $f$ being secured to such gear, and the worm $i$ being actuated by a friction-driver in contact with a flange $j$ upon the primary wheel $a$. Such friction-driver consists in a ring $k$, fitted loosely to a hub $l$ upon a shaft $m$, by means of which it is pressed toward the flange $j$ with the desired force. The shaft $m$ is connected with the worm-shaft $n$ by cog-wheels $o$, and the operation of the friction device is to rotate the worm and the wheel $f$ at a given speed, which would produce a given speed in the shaft $s$ by means of the intermediate gear $c$.

The hub $l$, upon which the friction-ring $k$ is mounted, is provided with a brake-groove $p$, to which a shoe $q$ is applied, and pressure upon such shoe, by means of the lever $r$, operates to retard or actually arrest the movement of the friction-hub and the consequent rotations of the worm-wheel. By inclining the thread of the worm in the required direction the worm-wheel and its attached bevel-wheel *b* may be rotated in the same or in a contrary direction to the wheel *a*, and the speed of the shaft *s* thereby increased or diminished.

The hub *l* is shown fitted to the shaft *m* by a spline *m'*, and the brake-lever is mounted upon a swivel-fulcrum, so that it may be used at pleasure to move the hub longitudinally upon its shaft. With such construction the hub may be shifted longitudinally upon the shaft *m* to remove the ring from contact with the driving-flange *j*, if it is desired to hold the worm normally stationary. By such means the waste of energy involved in the use of a brake will be avoided during the normal operation of the gearing. Such detachment of the friction-driver from the flange *j* does not release the controlling-gear, as the worm operates normally as a locking device and holds the worm-wheel fixed in every position to which it is turned.

With the construction shown the intermediate gear actuates the driving-shaft *s* with a variable speed; but in the construction shown in Figs. 4 and 5 one of the lateral gears is attached to the shaft, and the intermediate gear is employed as the controlling-gear by fixing it inside a ring upon which the worm-wheel is formed. In these figures, *a* is the primary gear, rotated by gears *h'*, connected with the armature *h*. *b* is the driven gear for actuating the shaft *s* at a variable speed, and the intermediate gear *c* is controlled in its movements about the shaft by affixing it radially within the worm-wheel *f'*. With this construction the worm-ring is held concentric with the hub *e* by two studs *d*, and two of the intermediate gears *c* are used to balance the frictional pressure of the hub upon the shaft. The driving-flange *j'* to actuate the worm is formed as a disk upon the back of the wheel *a*, and a friction-wheel *t* in contact with the disk is fitted to a spline upon a shaft *u*, which is connected with the worm by cog-wheels *o*. A lever *v* is provided to shift the wheel *t* to and from the center of the disk, thus varying the velocity imparted to the worm *i*. A clearance *w* is formed in the disk adjacent to the shaft *s* to remove the friction-wheel *t* from contact with the disk when required, which wholly arrests its motion and permits the worm to hold the worm-wheel stationary. In such position the wheel *b* is obviously driven at the same velocity as the wheel *a* and in an opposite direction, while the inclination of the teeth upon the worm may be arranged so as to either increase or diminish the velocity of the wheel *b* when the worm is rotated.

The armature is shown in Fig. 4 connected with the sleeve *g'* by cog-wheels *h'*, which may be proportioned to produce a relatively slow motion of the sleeve when the armature is rotated rapidly. Such an arrangement is especially adapted for use with a quickly-running motor, while the construction shown in Fig. 1 is better adapted for a slow-running motor.

It will be understood that the power derived from the use of a worm renders a friction-driver (such as the flange *j* or disk *j'* herein) entirely applicable to regulate the motion of the controlling-gear, although a friction-driver may not be adequate to transmit the entire power required to propel the shaft *s*. Such an application of the friction-driver is possible, because the differential gearing transmits a great part of the force directly to the shaft *s*, while the worm-regulator operates only to vary the speed with which such power is transmitted.

From the above description it will be seen that the worm-regulator may be applied to different wheels in the train to operate in controlling the velocity, and that the speed of such controlling-wheel may be varied in a practical and convenient manner by the use of a friction-driver, which is the most desirable agent to vary the velocity, as it operates without shock or jar.

As a train of differential gearing may be constructed with spur-gears, it is obvious that my invention may be applied thereto by connecting the worm-wheel with a suitable spur-wheel in the train.

I do not claim, broadly, herein a regulating device connected with the driving member and an intermediate member of a train of differential gearing to control the movement of the driven member, such construction being made the subject of my patent application, Serial No. 362,062, filed August 15, 1890.

Having thus set forth the nature of my invention, what is claimed herein is—

1. The combination, with a train of differential gearing comprising two gears mounted concentric with and independent of each other, an intermediate gear meshing therewith and revolved in a path concentric with the same, and means for rotating one of such gears as a motor-gear, of a worm-wheel connected with one of the other gears in the train, a worm meshing therewith, and means for controlling the movement of the same to regulate the speed of the third gear, as and for the purpose set forth.

2. The combination, with a train of differential gearing comprising two gears mounted concentric with and independent of each other, an intermediate gear meshing therewith and revolved in a path concentric with the same, and means for rotating one of such gears as a motor-gear, of a worm-wheel connected with one of the other gears in the train, a friction-driver rotated with the motor-gear, and a friction-wheel driven by the same and connected with the worm to vary the movement of the same and the speed of the third gear, as and for the purpose set forth.

3. The combination, with a driven shaft, of a pair of bevel-gears fitted to turn upon the same, a hub fixed upon the shaft between such gears, with a radial stud, an intermediate gear applied to the stud and meshing with the bevel-gears, a worm-wheel and worm connected with one of the bevel-gears, and a friction-driver connected with the other bevel-gear and with the worm to vary the speed of the worm-wheel and its attached gear, as and for the purpose set forth.

4. The combination, with a driven shaft, of a pair of bevel-gears fitted to turn upon the same, a hub fixed upon the shaft between such gears, with a radial stud, an intermediate gear applied to the stud and meshing with the bevel-gears, a worm-wheel and worm connected with one of the bevel-gears, a friction-disk rotated with the other bevel-gear, an electric motor for driving such disk and gear, and a friction-wheel pressed upon the disk and movable to and from its center, with a connection to the worm to vary the speed of the worm-wheel and its attached gear, as and for the purpose set forth.

In testimony whereof I have hereunto set my hand in the presence of two subscribing witnesses.

CYRA B. WATTLES.

Witnesses:
FOSTER M. VOORHEES,
HENRY J. MILLER.